United States Patent [19]

Schwartz et al.

[11] Patent Number: 5,021,090

[45] Date of Patent: Jun. 4, 1991

[54] WATER-BASED DIARYLIDE PIGMENT COMPOSITIONS

[75] Inventors: Russell J. Schwartz; Manuel Z. Gregorio, both of Cincinnati, Ohio

[73] Assignee: Sun Chemical Corporation, Fort Lee, N.J.

[21] Appl. No.: 356,022

[22] Filed: May 23, 1989

[51] Int. Cl.$^5$ .............................................. C09D 11/02
[52] U.S. Cl. ..................................... 106/23; 106/496; 564/271; 534/747
[58] Field of Search ................. 106/23, 496; 564/271; 534/747

[56] References Cited

U.S. PATENT DOCUMENTS

| | | | |
|---|---|---|---|
| 3,025,287 | 3/1962 | Ribka | 106/23 |
| 3,172,883 | 3/1965 | Inman | 106/23 |
| 3,361,736 | 1/1968 | Ribka | 106/23 |
| 3,719,658 | 3/1973 | Conley | 106/23 |
| 3,775,148 | 11/1973 | Bradley | 106/496 |
| 3,776,749 | 12/1973 | McKay et al. | 106/496 |
| 3,905,825 | 9/1975 | Gaetani et al. | 106/496 |
| 3,991,044 | 11/1976 | Conley | 106/496 |
| 4,024,871 | 5/1980 | Johnson et al. | 106/20 |
| 4,044,036 | 8/1977 | Hari et al. | 556/32 |
| 4,062,838 | 12/1977 | Cseh et al. | 534/748 |
| 4,269,769 | 5/1981 | Moiso et al. | 534/745 |
| 4,285,863 | 8/1981 | Battisti et al. | 534/744 |
| 4,457,783 | 7/1984 | Hamilton et al. | 106/494 |
| 4,462,833 | 7/1984 | Hays et al. | 106/23 |
| 4,468,255 | 8/1984 | Schwartz et al. | 106/494 |
| 4,515,639 | 5/1985 | Dopfer et al. | 106/496 |
| 4,589,921 | 5/1986 | Hunger et al. | 106/23 |
| 4,643,770 | 2/1987 | Hays | 106/23 |
| 4,648,907 | 3/1987 | Hays et al. | 106/496 |
| 4,680,057 | 7/1987 | Hays | 106/23 |

FOREIGN PATENT DOCUMENTS

| | | |
|---|---|---|
| 1080115 | 8/1967 | United Kingdom . |
| 1080116 | 8/1967 | United Kingdom . |
| 1156835 | 8/1969 | United Kingdom . |
| 1288044 | 9/1972 | United Kingdom . |
| 1334570 | 10/1973 | United Kingdom . |

OTHER PUBLICATIONS

"Printing Inks", Carlton Ellis, 7/61, pp. 274–281.
Pigment Handbook, vol. III, 1973, pp. 157–164.
T. Varnardakis, "Improving Dispersion of Organic Pigments", Modern Paint and Coatings, Sep. 1985.
Herst et al., "Pigmenting Problems of Yellow Illustration Gravure Printing Inks", deFaget, 30(11), 1976.

*Primary Examiner*—William R. Dixon, Jr.
*Assistant Examiner*—Helene Klemanski
*Attorney, Agent, or Firm*—Jack Matalon

[57] ABSTRACT

Water-based diarylide pigment compositions containing diarylide pigment modified with water-soluble amines. The pigment compositions are useful in both water-based coating and ink compositions.

14 Claims, No Drawings

WATER-BASED DIARYLIDE PIGMENT COMPOSITIONS

BACKGROUND OF THE INVENTION

1. Field of the Invention

The present invention relates to water-based inks.

2. Description of the Related Art and Brief Description of the Invention

Diarylide pigments represent an important class of coloring agents used primarily in the manufacture of inks. The most utilized diarylide pigments include, but are not limited to, the following: Pigment Yellow 12, Pigment Yellow 13, Pigment Yellow 14, Pigment Yellow 17 and Pigment Yellow 83.

It is documented in the prior art literature that the addition of fatty primary amines to an aqueous slurry of Pigment Yellow 12, followed by filtration and drying at an elevated temperature, results in a pigment having superior properties (e.g., increased strength, gloss, transparency, and lower rheology) when used to make a solvent-based printing ink, especially a publication gravure type ink. (B.P. 1,080,835). There are many variations on this technology which have also been patented. Some include the use of diamines to reduce penetration (E.P. 57,880), the use of rosin amine (B.P. 1,080,116; B.P. 1,288,044), the use of heterocyclic amines (B.P. 1,334,570), etc. There are also many patents on the process of forming the azomethine additive (aka Schiff's Base or ketimine).

Thus, some patents include pre-reaction of the amine and the acetoacetanilide, followed by reaction with tetrazotized DCB (B.P 1,334,570; U.S. Pat. No. 4,643,770). Others utilize reaction of the dry Pigment Yellow 12 in a solvent to form the azomethine (U.S. Pat. No. 4,468,255), but most, simply form the additives by drying the presscake containing the amine.

Although the use of the numerous aforementioned amine treatments afford pigments with improved application properties in solvent-based inks (e.g., publication gravure, nitrocellulose packaging, solvent flexo), the use of amine modification for water-based inks has not been exploited, and is within the scope of the present invention. Accordingly, it has been determined that by producing the azomethine compounds of the present invention, diarylide pigment compositions exhibiting significantly improved application properties in water-based ink and coating compositions can be obtained. This is of increasing importance with the current trend toward the use of water-based printing inks. The use of the products of this invention by affording stronger and improved diarylide pigments for water inks, offers significant economic incentives required for printers to change from the traditionally less costly solvent inks

SUMMARY OF THE INVENTION

Accordingly, it is an object of the present invention to provide improved diarylide pigments for water-based inks and coatings.

The foregoing and other objects are achieved by providing a water-based pigment composition including an azomethine composition of matter having the general formula:

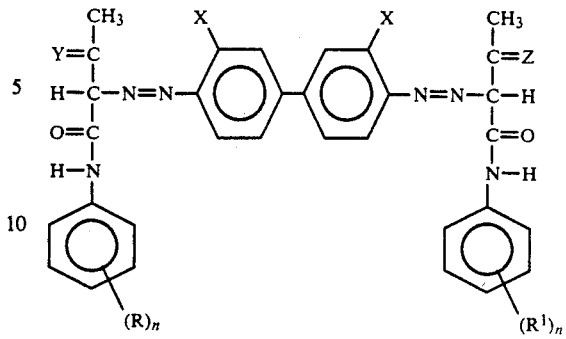

wherein:

R and $R^1$ are H, $CH_3$, $OCH_3$, $OCH_2CH_3$ or Cl;

n is an integer from 1 to 5;

X is Cl, $CH_3$ or $OCH_3$;

Y is $N-R^2$, wherein $N-R^2$ is derived from a water-soluble primary amine, and $R^2$ is a monomeric or polymeric hydrocarbyl group containing 1-20 carbon atoms in the monomeric unit; and Z is either O or Y.

The water-soluble amine used to synthesize I, must be a primary amine and preferably contains one or more hydrophilic functionalities, e.g., OH, $OR^3$, $N(R^3)_2$, $NH_2$, $NO_2$, $SO_3H$, COOH and $PO_3H$, wherein $R^3$ is an alkyl group containing 1 to 4 carbon atoms. The pigment composition includes diarylide pigment. The pigment composition may be prepared by reacting the water-soluble amine with acetoacetanilide or substituted acetoacetanilide to produce an azomethine, followed by reacting the azomethine with tetrazotized 3,3'-dichlorobenzidine. The composition may also be prepared by contacting the water-soluble amine with diarylide pigment. Improved coating and ink compositions are provided which include the pigment composition.

DETAILED DESCRIPTION OF THE PREFERRED EMBODIMENTS

The present invention is directed to diarylide pigments having improved properties for use in water-based inks and coatings. The improved diarylide pigments are obtained by modifying the diarylide pigment by reaction with a water-soluble amine to generate azomethine diarylide pigment derivatives.

The modifying amine may be any water-soluble primary amine. The water-soluble primary amines preferably contain one or more primary amines and one or more hydrophilic functionalities. Examples of preferred amines include the following:

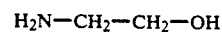

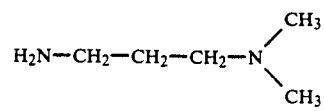

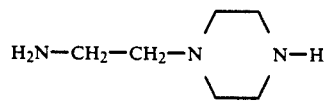

-continued

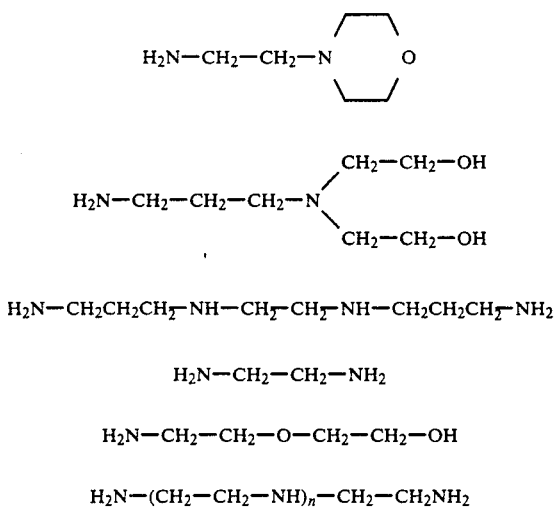

$H_2N-CH_2CH_2CH_2-NH-CH_2-CH_2-NH-CH_2CH_2CH_2-NH_2$ $H_2N-CH_2-CH_2-NH_2$ $H_2N-CH_2-CH_2-O-CH_2-CH_2-OH$ $H_2N-(CH_2-CH_2-NH)_n-CH_2-CH_2NH_2$ wherein n is about 2 to about 100.

The diarylide pigment may be any of the known type derived from coupling of tetrazotized 3,3'-dichlorobenzidine or dianisidine with acetoacetanilide, acetoacetanilides, or mixtures of various acetoacetanilides, and substituted acetoacetanilides. Diarylide yellow and orange pigments are especially useful for modification in accordance with the present invention. Other diarylide pigments may be used. Typical diarylide pigments have the following general formula:

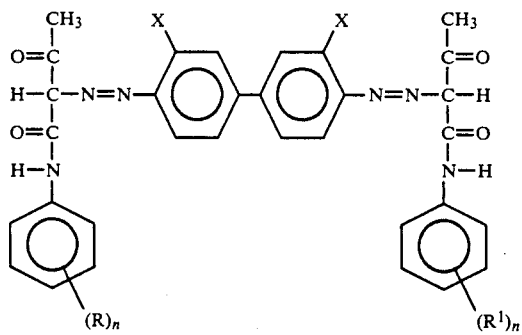

wherein:

R and $R^1$ are H, $CH_3$, $OCH_3$, $OCH_2CH_3$ or Cl;
n is an integer from 1 to 5; and
X is Cl, $CH_3$, or $OCH_3$.

Of these types of pigments, the following are preferred: Pigment Yellow 12, Pigment Yellow 13, Pigment Yellow 14, Pigment Yellow 17, Pigment Yellow 83, Pigment Yellow 114, Pigment Yellow 126, Pigment Yellow 127, Pigment Yellow 176, and Pigment Orange 16.

Accordingly, the water-based pigment compositions of the present invention include an azomethine composition of matter having the general formula:

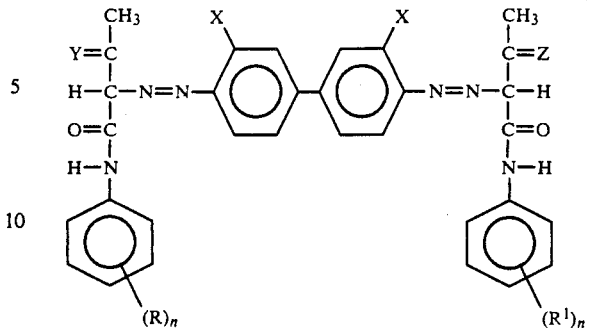

wherein:

R and $R^1$ are H, $CH_3$, $OCH_3$, $OCH_2CH_3$ or Cl;
n is an integer from 1 to 5;
X is Cl, $CH_3$, or $OCH_3$;
Y is N—$R^2$, wherein N—$R^2$ is derived from a water-soluble primary amine, and $R^2$ is a monomeric or polymeric hydrocarbyl group containing 1-20 carbon atom in the monomeric unit; and
Z is either O or Y.

The azomethine should be present in the pigment composition in an amount which will effect the improved results of the invention. Preferably this amount will be up to about 50 wt. % based upon the weight of the pigment product, and most preferably in an amount between about 5 and 30 wt. %. When used in inks and coatings, the azomethine may comprise up to about 25 wt. % of the pigment composition, and preferably comprises between about 0.1 and about 7.5 wt. % of the composition. All percentages expressed in this specification are weight percent unless otherwise specified.

The modified diarylide pigment composition of the present invention may be produced by combination of the pigment or pigment precursors and the modifying amine in any sequence. The amine modifier may be reacted with an acetoacetanilide, followed by reacting the resulting azomethine coupler with tetrazotized 3,3'-dichlorobenzidine to couple it thereto. The azomethine coupler is derived from an acetoacetanilide. Most preferred is acetoacetanilide, acetoacet-2,4-xylidide, acetoacet-o-toluidide, acetoacet-o-anisidide or acetoacet-2,5-dimethoxy-4-chloranilide. The tetrazotized 3,3'-dichlorobenzidine may be formed by reacting 3,3'-dichlorobenzidine with sodium nitrite in the presence of hydrochloric acid. O-dianisidine may be used in place of, or in combination with 3,3'-dichlorobenzidine.

The following generally illustrates the reaction scheme when the modified diarylide pigments are produced in this manner:

Azomethine Formation

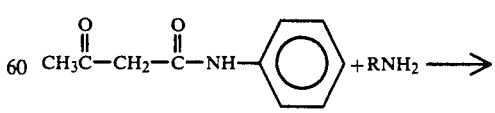

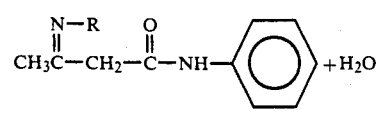

Tetrazonium Salt Formation

-continued

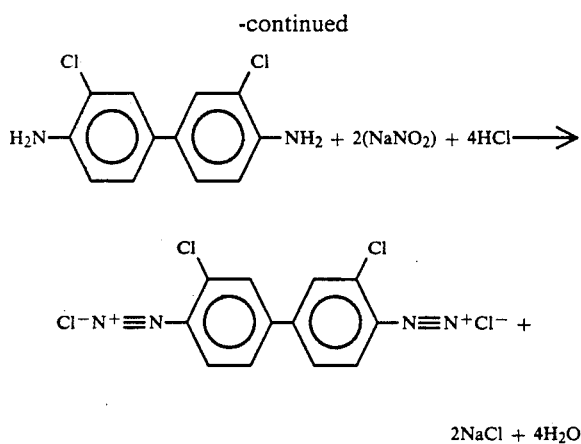

2NaCl + 4H₂O

Azomethine Modified Pigment Formation

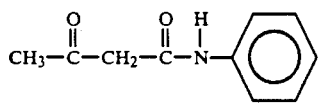

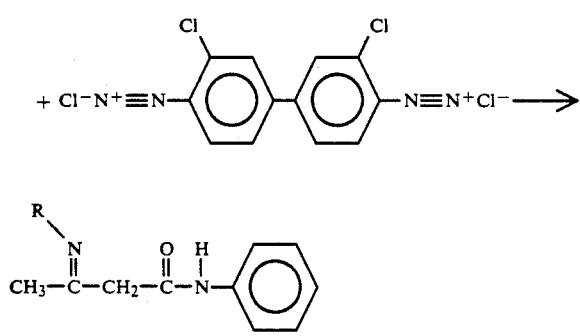

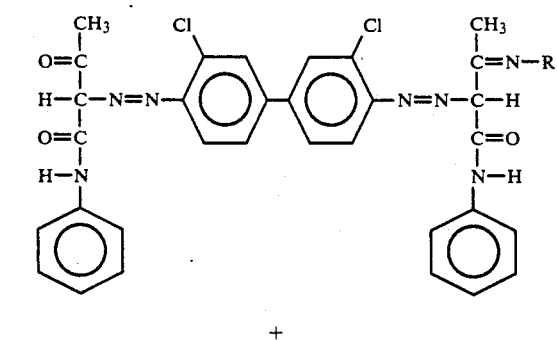

+

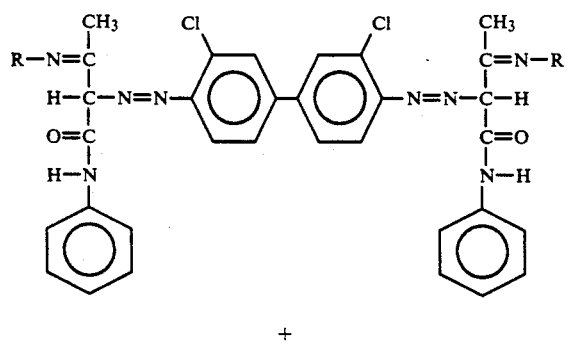

+

-continued

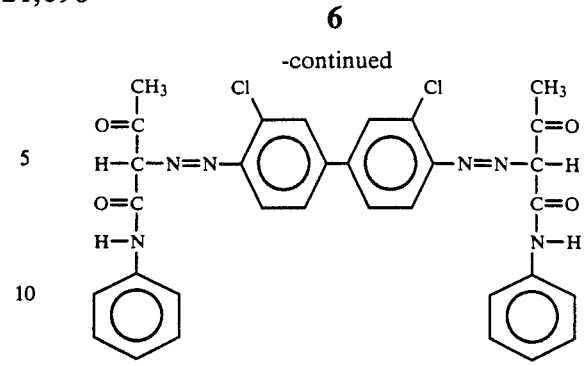

Diarylide pigments may also be modified in accordance with the present invention by directly reacting the amine modifier with the diarylide pigment, in the usual manner. The amine is preferably contacted with the pigment presscake, followed by heating the mixture at about 85° C. to remove water.

Alternately, a diarylide pigment presscake may be dried, and the pigment transferred to a solvent, followed by reaction of the amine modifier with the pigment while in the solvent, in the usual manner.

The following generally illustrates the reaction scheme when the modified diarylide pigments are produced in accordance with these methods.

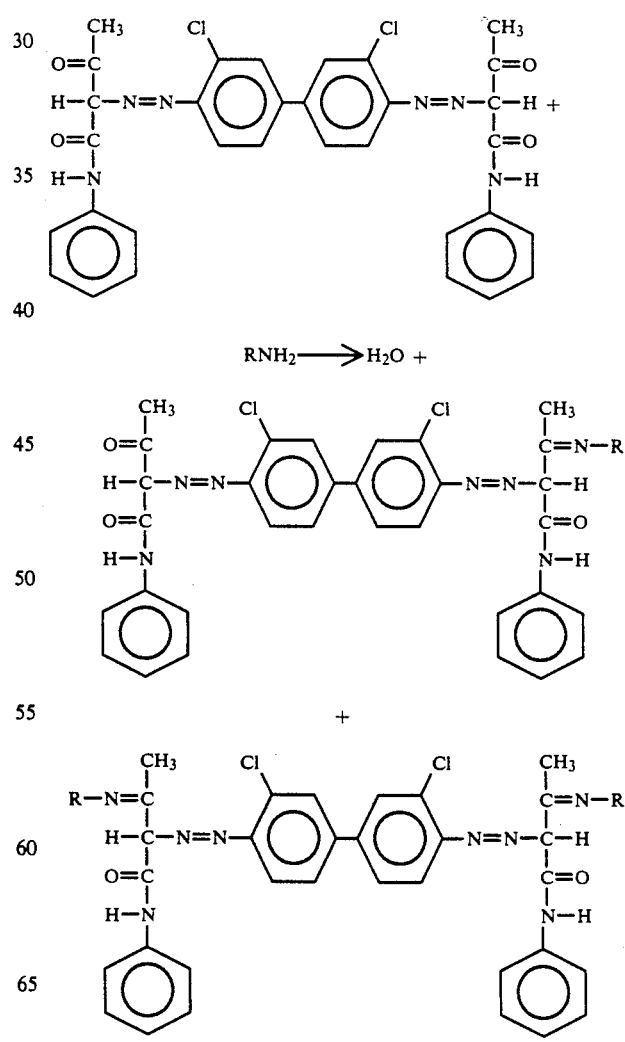

A stable, high-quality water-based dispersion may be formulated according to the following. A pigment presscake containing the azomethine compound and about 20 wt.% to about 25 wt.% pigment is dried to about 50 wt.% pigment and mixed under high shear with a water-based varnish to formulate a homogeneous premix. The premix may then be combined with additional water and varnish and dispersed by use of a shot mill or ball mill to produce a mill base of about 30 wt.% pigment.

To illustrate how diarylide pigment may be modified in accordance with the present invention, the following examples set forth methods whereby pigment compositions were produced:

EXAMPLE 1

Tetrazotized 3,3'-dichlorobenzidine (DCB) was prepared by charging 21.7 parts of 3,3'-dichlorobenzidine to 39.8 parts of 20° Be HCl and 140 parts of an ice/water mixture with constant stirring to form a homogeneous suspension. To this was then added 32.6 parts of 38% sodium nitrite and stirring continued for 1 hour at a temperature of 0-5° C. The excess nitrous acid was then destroyed by the addition of approximately 0.5 parts sulfamic acid.

A fine suspension of acetoacetanilide (AAA) was prepared by charging 27.1 parts AAA to 400 parts $H_2O$ and 33.6 parts of 50% aqueous NaOH, and the mixture was stirred until all of the AAA was dissolved. The temperature of the solution was adjusted to 0-5° C. with the addition of ice and subsequently the AAA was precipitated by the slow addition of 38.5 parts of 70% acetic acid.

An azomethine coupling component was formed by charging 4.8 parts of AAA to 2.7 parts of N,N-Dimethylaminopropylamine and heating the mixture to 95° C. with stirring. After 1 hour, the reaction was complete as evidenced by the disappearance of the ketone absorption band in the IR spectrum (approximately 1673 cm$^{-1}$). The resulting azomethine was added to the suspension of AAA immediately prior to coupling with the tetrazotized DCB.

Coupling was then carried out by adding the tetrazotized DCB to the AAA suspension over a period of 1 hour. Stirring was continued until no excess tetrazo remained, and then the slurry was heated to 90-95° C., stirred 15 minutes, filtered, washed and dried in an oven at 60° C.

Evaluation was performed by charging 25 parts of the pigment to 75 parts of a water-based ink vehicle containing a commercial grade acrylic resin (Joncryl 67; S.C. Johnson) and 300 parts of ⅛th inch stainless steel balls. The mixture was placed on a "Red Devil" paint shaker for 30 minutes, to produce a mill base. The viscosity of the mill base was approximately one-half of that of a conventional Pigment Yellow 12 made with Duomeen T. Water flexo inks were prepared by letting back the mill bases with additional vehicle to a pigment content of 9.0%. The pigment produced an ink that was approximately 20% stronger, glossier and more transparent than those prepared from the conventional Pigment Yellow 12.

EXAMPLE 2

Example 1 was repeated except that 29.2 parts of acetoacet-o-toluidide (AAOT) was used in place of the AAA. The resulting Pigment Yellow 14 when evaluated as in Example 1, gave similar results versus a Pigment Yellow 14 made with 5.0% Triamine T.

EXAMPLE 3

The procedure of Example 1 was followed except the suspension of precipitated AAA and the azomethine coupler were added to the solution of tetrazo. Results were similar to those of Example 1.

EXAMPLE 4

The procedure of Example 2 was followed to prepare a pigment presscake containing 75% water. The solids of the presscake were increased by mixing the mass at a temperature of 60° C. at reduced pressure to remove water, until a solids content of 50% was obtained. One hundred (100) parts of this presscake, was then added to 45 parts of an aqueous acrylic resin solution (28% Joncryl 678).

A premix was prepared by blending these components using a high-speed Cowles blade to afford a homogeneous suspension. This premix was then converted to a stable, high quality water-based dispersion by passing the mixture through a shot mill containing 1mm ceramic shot, operating at a speed of 5000 rpm.

The resulting dispersion had lower viscosity and increased tinting strength than a dispersion prepared from either an untreated Yellow 14 or a Yellow treated with the fatty amines of the prior art.

As can be seen by the above Examples 1-4, the modified diarylide pigments achieved significantly improved properties. Specifically, the modified diarylide pigments are characterized by a lower viscosity, in addition to improved strength, gloss, and transparency.

The modified diarylide pigments may be used in all aqueous applications where diarylide pigments are utilized. They are especially useful in water-based flexographic inks, water-based gravure inks, water-based news inks and any water-based coatings where diarylide pigments are utilized.

While certain representative embodiments and details have been shown for the purpose of illustrating the invention, it will be apparent to those skilled in the art that various changes may be made therein without departing from the spirit or scope of the invention.

What is claimed is:

1. A water-based ink composition, comprising an aqueous vehicle, diarylide pigment and an azomethine composition of matter having the formula:

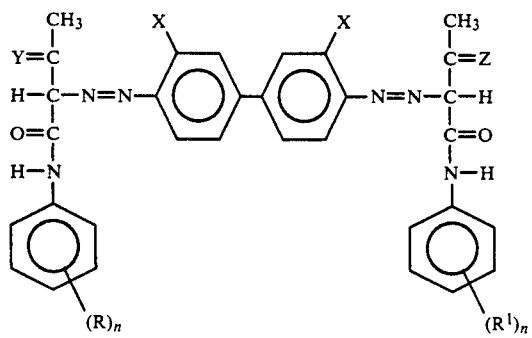

wherein:
R and R[1] are independently selected from the group consisting of H, $CH_3$, $OCH_3$, $OCH_2CH_3$ and Cl;
n is an integer from 1 to 5;

X is selected from the group consisting of Cl, CH$_3$ and OCH$_3$;

Y is N—R$^2$, wherein N—R$^2$ is derived from a water-soluble primary amine, and R$^2$ is a monomeric or polymeric hydrocarbyl group containing 1-20 carbon atoms in the monomeric unit; and Z is selected from the group consisting of O and Y.

2. A water-based ink composition as claimed in claim 1, wherein the water-soluble amine contains at least one hydrophilic functionality.

3. A water-based ink composition as claimed in claim 2, wherein the hydrophilic functionality is selected from the group consisting of OH, OR$^3$, N(R$^3$)$_2$, NH$_2$, NO$_2$, SO$_3$H, COOH, and PO$_3$H wherein R$^3$ is a C$_1$-C$_4$ alkyl group.

4. A water-based ink composition as claimed in claim 1, wherein the aqueous vehicle comprises water and at least one resin.

5. A water-based ink composition as claimed in claim 4, wherein the water is present in the composition in an amount of about at least 40 wt.%.

6. A water-based ink composition as claimed in claim 5, wherein the water is present in the composition in an amount of between about 50 wt.% and about 90 wt.%.

7. A water-based ink composition as claimed in claim 1, wherein the resin is present in the composition in an amount between about 10 wt.% and about 25 wt.%.

8. A water-based ink composition as claimed in claim 4, wherein the resin is present in the composition in an amount of up to about 15 wt.%.

9. A water-based ink composition as claimed in claim 1, further comprising alcohol.

10. A water-based ink composition as claimed in claim 9, wherein the alcohol is present in the composition in an amount of up to about 15 wt.%.

11. A water-based ink composition as claimed in claim 1, wherein the azomethine comprises not more than about 25 wt.% of the composition.

12. A water-based ink composition as claimed in claim 11, wherein the azomethine comprises about 0.5 to about 5 wt.% of the pigment composition.

13. A water-based ink composition as claimed in claim 1, wherein the diarylide pigment is selected from the group consisting of Pigment Yellow 12, Pigment Yellow 13, Pigment Yellow 14, Pigment Yellow 17, Pigment Yellow 83, Pigment Yellow 114, Pigment Yellow 126, Pigment Yellow 127, Pigment Yellow 176, Pigment Orange 16, and mixtures thereof.

14. A water-based ink composition as claimed in claim 13, wherein the diarylide pigment is present in the composition in an amount from about 1 wt.% to about 50 wt.%.

* * * * *